United States Patent [19]
Aschberger et al.
[11] Patent Number: 4,665,809
[45] Date of Patent: May 19, 1987

[54] SYSTEM FOR MIXING BEVERAGES

[75] Inventors: Matthias Aschberger; Karlheinz Färber; Ulrich Wolf, all of Giengen; Anton Deininger, Bachhagel, all of Fed. Rep. of Germany

[73] Assignees: The Coca-Cola Company, Atlanta, Ga.; Bosch-Siemens Hausgeraete GmbH, Munich, Fed. Rep. of Germany

[21] Appl. No.: 768,216

[22] Filed: Aug. 22, 1985

[30] Foreign Application Priority Data

Aug. 22, 1984 [DE] Fed. Rep. of Germany ....... 3430953
Aug. 22, 1984 [DE] Fed. Rep. of Germany ....... 3430901

[51] Int. Cl.[4] .......................... A47J 31/40; A23L 2/00
[52] U.S. Cl. ..................................... 99/323.1; 138/43; 222/129.4; 261/DIG. 7; 426/477
[58] Field of Search .................... 99/323.1, 323.2, 275; 261/DIG. 7; 138/43, 45; 426/477; 222/129.1, 129.3, 129.4

[56] References Cited

U.S. PATENT DOCUMENTS

| | | | |
|---|---|---|---|
| 2,618,217 | 11/1952 | Minder | 99/323.1 |
| 2,813,541 | 11/1957 | Beller | 138/43 X |
| 2,838,072 | 6/1958 | Stumm | 138/43 X |
| 2,962,046 | 11/1960 | Bochan | 138/43 X |
| 3,340,899 | 9/1967 | Welty | 138/43 |
| 3,431,944 | 3/1969 | Sakuma | 138/43 |
| 4,121,507 | 10/1978 | Kuckens | 99/275 |
| 4,437,493 | 3/1984 | Okuda | 138/45 |
| 4,497,348 | 2/1985 | Sedam | 261/DIG. 7 |

*Primary Examiner*—Billy J. Wilhite
*Attorney, Agent, or Firm*—Birch, Stewart, Kolasch & Birch

[57] ABSTRACT

A piston system is used as a pressure-independent flow-volume-regulating valve in which the piston divides the piston chamber into two sections which communicate with one another via a flow-throttling zone and, dependent upon pressures applied which are opposed on the piston by restoring forces, affects control orifices. The restoring force for the piston is guided over a compensating member for temperature-dependent expansions.

12 Claims, 2 Drawing Figures

SYSTEM FOR MIXING BEVERAGES

FIELD OF THE INVENTION

The invention relates to a system for mixing beverages, especially consisting of a liquid parent substance, more particularly carbonated water, and a beverage concentrate. Such a system is, for example, used in a beverage dispenser in which a beverage concentrate or, as required, one of a plurality of beverage concentrates, can be mixed with carbonated water to obtain a refreshing drink immediately before consumption.

BACKGROUND OF THE INVENTION

The carbonated water required for this purpose is chilled and stored under pressure. In a manner known from the prior art, this carbonated water is dispensed via a shutoff valve and, in some cases, via a pressure-reducing valve in series therewith for the mixing process. To a large extent, the quality of the blended beverage is dependent on the mixing ratio of beverage concentrate to carbonated water. Therefore, it is essential that steps be taken to ensure the mixing ratio needed for the different conditions prevailing during normal operation. For example, techniques are known for determining the quantity of beverage concentrates by means of metering chambers.

Particularly as a result of the considerably larger quantity of carbonated water added, the latter is dispensed in the known manner in a continuous flow, with the quantity determination resulting from the quantity dispensed per unit time and from the dispensing time. The dispensing time can easily be controlled by control measures known from the prior art. Problems may arise in the area of the mechanical dispensing unit, because the prior art techniques are not capable of determining sufficiently accurate flow volumes per unit time. A not negligible disturbance variable is seen in the fact that the liquid is supplied to the dispensing unit under different pressure conditions.

SUMMARY OF THE INVENTION

Therefore, the primary object of the invention is to provide a system that ensures the accurate determination of the amounts of liquid dispensed.

According to the invention, a system that meets the above requirements is characterized by the fact that a flow-volume-regulating valve that controls a constant flow irrespective of the pressure of the liquid supplied is connected in series with an outlet-shutoff valve, and that a timing unit is assigned to the outlet-shutoff valve.

A system designed according to the teachings of the invention follows the concept of assigning different functional units different functional requirements and arranging them in relation to one another as functionally oriented as possible. A functional requirement is that the opening time of the dispensing valve, which is predetermined by the timing unit, be realized with the highest degree of precision. Therefore, an outlet-shutoff valve is provided that can perform this task in exemplary fashion. But this component is not responsible for the control of the flow volume. For this purpose, a flow-volume-regulating valve that controls a constant flow irrespective of the pressure of the liquid supplied is provided. The latter, in turn, can perform in an excellent manner the task assigned to it. But it is also important that the two functional units be placed as closely together as possible so as to prevent the liquid from flowing out uncontrollably during the operating phases of the outlet-shutoff valve.

According to a preferred embodiment, the novel system is characterized by the fact that the pressureindependent flow-volume-regulating valve has a piston chamber with a sliding piston that is pressure-located with a restoring force, said piston chamber dividing the piston chamber into two sections, that a throttling zone is provided between said two sections, and that the first chamber section, in the direction of which acts as the reset force, has a constant flow inlet and the second pistonchamber section has a flow-outlet throttle whose cross section varies with the position of the piston. Such a system produces a very uniform flow volume, since the steps taken are extremely responsive to pressure fluctuations and, in dependence therefrom, alter the throttling behavior.

According to a preferred embodiment of the system incorporating the invention, the flow-inlet opening into the pressure-dependent flow-volume-regulating valve is designed as a throttling zone. Thus, already in this area the pressure is reduced so that the action of the controlling equipment is focussed on an area that approximates the dispensing pressure.

According to another preferred embodiment of the invention, the novel system is characterized by the fact that a plurality of holes are arranged on the periphery of the throttling chamber in the sliding area of the piston. By staggering these holes slightly in the direction of the piston stroke, a very favorable control characteristic for the flow volume can be achieved.

Advantageously, a spring is mounted on the piston to provide for a restoring force. In order to adjust the flow volume to a desired amount and to readjust the system, it is advisable to provide for a restoring force that is adjustable. This is done by means of a set screw that acts on the restoring spring.

A preferred embodiment of the system incorporating the invention is characterized by the fact that the restoring force for the control piston is guided via a temperature-compensating bar.

For example, plastic may be used for the housing of the regulating valve with measures adopted according to these features for improving the invention, while the control piston is made of metal. This choice of materials is advantageous both from the viewpoint of production engineering and of sliding technology. By using the temperature-compensating bar, the differing temperature-dependent expansions of these functional units can be compensated not only with respect to the varying conditions induced by the change of length, but also with respect to the differing diameter parameters. Advantageously, the appropriate choice of material for the temperature-compensation bar is determined empirically.

A very simple arrangement of the temperaturecompensating bar results by integrating the latter into the set-screw mechanism.

BRIEF DESCRIPTION OF THE DRAWINGS

A specific embodiment designed in accordance with the features of the invention will be described in detail with reference to the accompanying drawing, in which.

DETAILED DESCRIPTION OF THE DRAWINGS

Figure 1:
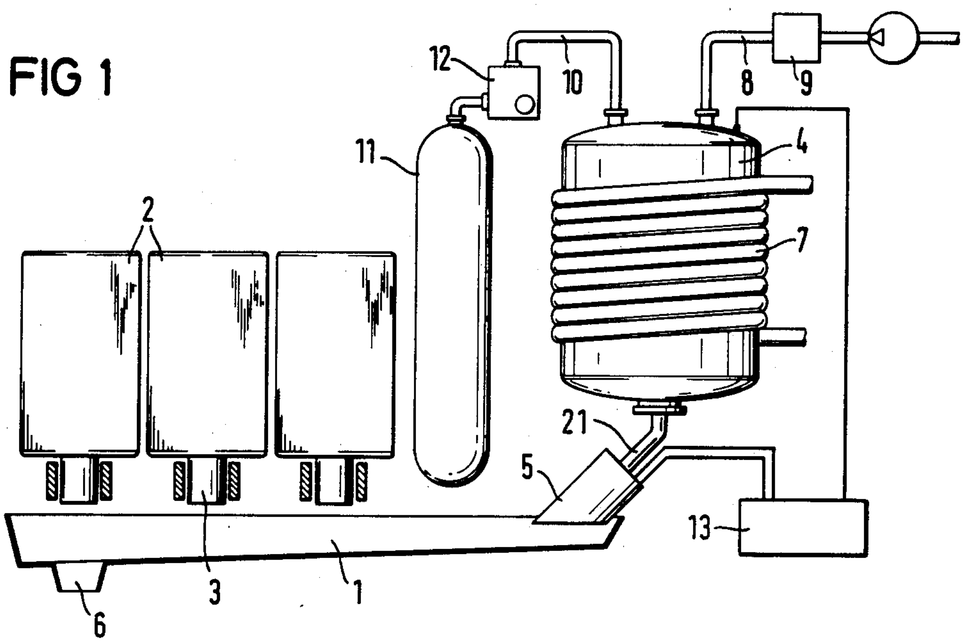
FIG. 1 is a schematic view of a mixing unit for a beverage dispenser.

A beverage dispenser for the selective mixing of different beverage concentrates with chilled $CO_2$ water to obtain a blended beverage contains as essential constituents a mixing trough 1 in which the mixing process is initiated or carried out, a beverage-concentrate container 2 from which, by means of metering units 3, the beverage concentrates are fed in batches to the mixing trough 1, and a storage vessel 4 for chilled $CO_2$ water, which, through a dispensing valve 5, can flow into the mixing trough as required. The beverage mixture leaves the mixing trough 1 through a discharge funnel 6. The $CO_2$ water supply is chilled with refrigerants which are conducted via a conduit 7 wound around the storage vessel 4. The $CO_2$ water supply in the vessel 4 is replenished by the amounts drawn off via the dispensing valve 5 by supplying fresh water via a conduit 8—controlled by a valve system 9—and $CO_2$ gas via a conduit 10 from a container 11 with a $CO_2$ gas charge controlled by a valve system 12. The quality of the blended beverage that can be achieved is to a large extent dependent on the mixing ratio of beverage concentrate to carbonated water. The amount of beverage concentrate is determined with an adequate degree of accuracy by metering units 3 of known construction. Now, an appropriate quantity of carbonated water is to be mixed with the particular amounts of beverage concentrate. To control the dispensing of this carbonated water from the storage vessel 4, use is made of the dispensing valve 5 shown in section in FIG. 2. The time is controlled with a trigger circuit 13 to be discussed in detail hereinafter.

Figure 2:
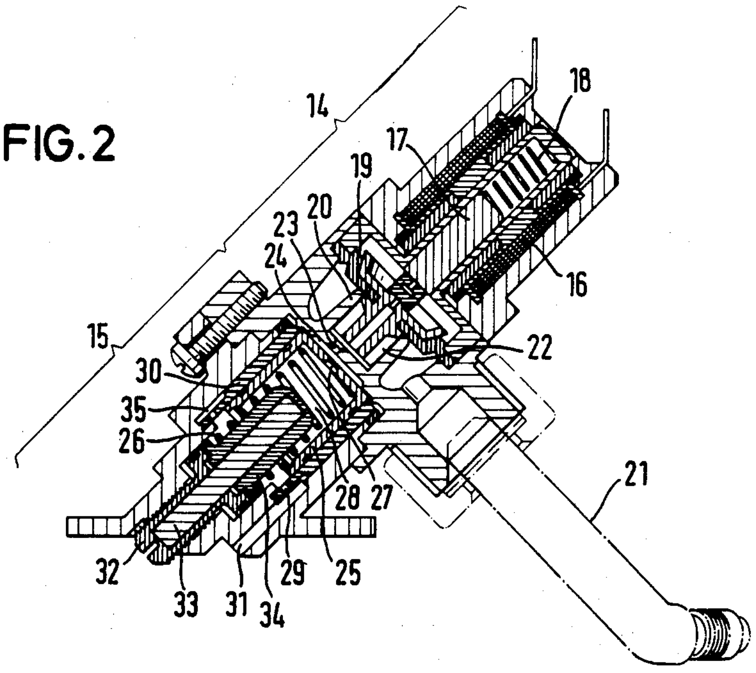
FIG. 2 shows a system for dispensing carbonated water with a uniform flow volume.

The dispensing valve 5 depicted in FIG. 2 mainly consists of two functional units, viz. an electromagnetically triggered flow-shutoff valve 14 and a flow-volume-regulating valve 15 that controls the flow volume irrespective of the liquid pressure supplied. The flow-shutoff valve 14 contains a solenoid coil 16. Upon excitation of this coil by a current passage, a magnet armature 17 is attracted against the thrust of a spring 18. In the process, a membrane 19 connected to this dipper armature is lifted off its valve seat 20, so that the carbonated water supplied from the storage vessel 4 via the conduit 21 can pass through this shutoff valve practically unhindered. This water finds its way to the area of the flow-volume-regulating valve 15 through channels 22 and a hole 23 in the housing, i.e., to the inlet-side section 24 of a piston chamber of this flow-volume-regulating valve. A piston jacket 25 placed in this piston chamber is pressure-loaded with the biasing force of a spring 26 in the direction of the inlet area 24 of the carbonated water. In the end face of the piston there is drilled a throttling hole 27, so that the carbonated water fed from the first section 24 of the piston chamber can reach its second section 28. Pressure reduction takes place at this throttling hole 27 when there is a flow.

On the periphery of the second section 28 of the piston chamber, there are provided a plurality of holes 29 in the cylinder liner 30, which lead via a closed circuit 35 in the housing wall to an outlet channel 31. These holes 29 are provided in the stroke area of the piston jacket 25. If a high pressure is applied to the area of the first section 24, the piston is pressed more strongly against the biasing force of the spring 26, so that a greater portion of the outlets 29 is covered by the piston jacket. In the process, a greater throttling actio takes place in these areas. If a lower pressure prevails in the area of the first section 24 of the throttling chamber, the piston 25 follows the thrust of the spring 26 and a greater portion of the outlets 29 is cleared for fluid flow. Thus, the throttling action on the liquid passing through this area is reduced. Now, by appropriate dimensioning, it is possible to change the throttling action in the area of the outlets 29 in proportion to the liquid pressure applied to the first section 24 of the piston chamber. In this way, the flow volume of the carbonated water can be regulated constantly, irrespective of the pressure of the liquid fed through the conduit 21.

Thus, the quantity of carbonated water dispensed can be determined with a high degree of precision through appropriate timing.

In order to be able to adjust and readjust the flow volume, the thrust of the spring 26 can be varied by changing its compression by means of an adjusting screw 32. There is integrated into this screw 32 a temperature-expansion compensating bar 33 on which a sleeve 34 is mounted. The drawback spring 26 is supported against this sleeve 34, i.e., directly opposite the valve housing. By using this technique, it is possible to make the valve housing of the flow-volume-regulating valve 15, the cylinder liner 30, the piston 25, and the adjusting screw 32 from different materials with differing temperature-expansion coefficients. By means of this temperature-expansion compensating bar 33, one can nevertheless prevent differing operating temperatures from having an impact on the flow-volume-regulating valve of the system.

What is claimed is:

1. A system for mixing beverages, composed of a carbonated water and a beverage concentrate comprising:

a pressure responsive flow-regulating valve for maintaining a constant flow of carbonated water therethrough independently of the pressure of the carbonated water thereto supplied;

an outlet-shutoff valve connected to said flow-regulating valve and disposed upstream thereof;

a sequence timer connected to the outlet-shutoff valve;

said pressure dependent flow-regulating valve including a piston chamber with a sliding piston dividing the chamber into first and second piston chamber sections, the piston being biased toward said first piston chamber section by a restoring force, flow-throttling section formed between said first and second piston chamber sections, said first piston chamber section having a constant flow inlet opening for receiving said carbonated water, and directing said carbonated water against said piston in opposition to said restoring force, said second piston chamber section having flow-outlet throttle means whose cross section is in response to movement of said piston to positions determined by the relative values of the pressure of said carbonated water and said restoring force.

2. A system according to claim 1, wherein the flow inlet opening is said throttling means.

3. A system according to claim 1, wherein the flow-outlet throttle means consists of a plurality of holes located around the periphery of the piston chamber.

4. A system according to claim 1, wherein the restoring force is exerted by a spring element.

5. A system according to claim 1, wherein the restoring force acting on the piston is adjustable.

6. A flow-volume-regulating valve according to claim 5, wherein an adjusting screw acting on a spring element for the purpose of varying the restoring force.

7. A system according to claim 1, wherein the restoring force for the control piston acting against the supply pressure of the flowing medium is exerted via a temperature-compensating bar.

8. A flow-volume-regulating valve according to claim 7, wherein the temperature-compensating bar is integrated into the adjusting screw.

9. A flow-volume-regulating valve according to claim 1, wherein the valve housing is made of plastic and the control piston of metal.

10. A dispensing valve in a system for mixing beverages having carbonated water and beverage concentrate therein, said dispensing valve comprising:

shutoff valve means for supplying a flow of carbonated water through said dispensing valve;

means for initiating operation of said shutoff valve means; and flow regulating valve means, responsive to and fluidly connected in series with said shutoff valve means, for supplying a constant flow of the carbonated water through said dispensing valve independently of the pressure of said carbonated water.

11. A dispensing valve according to claim 10, wherein said shutoff valve means includes:

an inlet conduit for providing a supply of the carbonated water thereto, a solenoid coil responsive to said means for initiating an operation of said shutoff valve means, a magnet armature inserted within said solenoid coil, a biasing spring for forcing said magnet armature toward said inlet conduit, a membrane connected to one end of said magnet armature, and a valve seat for engaging said magnet armature having said membrane connected to one end thereof to shut off the supply of carbonated water supplied through said inlet conduit.

12. A dispensing valve according to claim 10, wherein said flow regulating valve means is pressure responsive and includes:

a piston chamber having a sliding piston positioned therein, said sliding piston dividing said piston chamber into first and second sections in the direction of fluid flow, respectively, a flow throttling opening formed in said piston chamber between said first and second sections, means for maintaining a restoring force on said piston chamber in the direction of said first section, a constant flow inlet opening formed in said first section for receiving fluid flow from said shutoff valve means, and a fluid flow outlet channel formed in said second section, the cross section of said second section being varied in response to the fluid flow pressure against the restoring force on said piston chamber, thereby maintaining a constant fluid flow in said outlet channel.

* * * * *